United States Patent
Jeong

(10) Patent No.: US 8,793,680 B2
(45) Date of Patent: Jul. 29, 2014

(54) APPARATUS AND METHOD FOR COOPERATIVELY UPDATING FIRMWARE ON WIRELESS MESH NETWORK

(75) Inventor: Jongsoo Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 13/280,957

(22) Filed: Oct. 25, 2011

(65) Prior Publication Data

US 2012/0102478 A1    Apr. 26, 2012

(30) Foreign Application Priority Data

Oct. 25, 2010   (KR) .......................... 10-2010-0103929

(51) Int. Cl.
*G06F 9/445*    (2006.01)

(52) U.S. Cl.
USPC ............................. 717/170; 717/173; 717/174

(58) Field of Classification Search
USPC ............................. 717/170–177; 709/203–204
See application file for complete search history.

(56) References Cited

U.S. PATENT DOCUMENTS

| | | | | |
|---|---|---|---|---|
| 6,836,483 | B1 * | 12/2004 | Lee ........................... | 370/395.31 |
| 7,073,172 | B2 * | 7/2006 | Chamberlain ................ | 717/169 |
| 7,246,351 | B2 * | 7/2007 | Bloch et al. ................... | 717/175 |
| 7,634,772 | B2 * | 12/2009 | Parthasarathy et al. ....... | 717/178 |
| 7,694,291 | B2 * | 4/2010 | Chen et al. .................... | 717/162 |
| 7,739,679 | B2 * | 6/2010 | Qumei .......................... | 717/170 |
| 7,814,474 | B2 * | 10/2010 | Chen et al. .................... | 717/168 |
| 7,870,548 | B2 * | 1/2011 | Chen et al. .................... | 717/168 |
| 7,958,502 | B2 * | 6/2011 | Motta et al. ................... | 717/168 |
| 7,996,829 | B2 * | 8/2011 | Depew et al. ................. | 717/170 |
| 8,233,893 | B2 * | 7/2012 | Chen ............................. | 455/419 |
| 8,255,894 | B2 * | 8/2012 | Nakagawa et al. ........... | 717/168 |
| 8,261,256 | B1 * | 9/2012 | Adler et al. ................... | 717/173 |
| 8,316,361 | B2 * | 11/2012 | Watson et al. ................ | 717/168 |
| 8,375,381 | B1 * | 2/2013 | Clark et al. ................... | 717/170 |
| 8,418,168 | B2 * | 4/2013 | Tyhurst et al. ................ | 717/173 |
| 8,429,640 | B2 * | 4/2013 | Yin et al. ....................... | 717/168 |
| 8,448,161 | B2 * | 5/2013 | Goldman ...................... | 717/170 |

(Continued)

FOREIGN PATENT DOCUMENTS

| KR | 1020090062317 | 6/2009 |
|---|---|---|
| KR | 1020100063869 | 6/2010 |

OTHER PUBLICATIONS

Shyu et al, "A Unified Framework for Image Database Clustering and Content-based Retrieval", ACM, pp. 19-27, 2004.*

(Continued)

*Primary Examiner* — Anil Khatri
(74) *Attorney, Agent, or Firm* — Nelson Mullins Riley & Scarborough LLP; Anthony A. Laurentano, Esq.; Lewis Lee, Esq.

(57) ABSTRACT

An apparatus updates firmware running on nodes in a wireless mesh network. The apparatus includes a code image DB for storing a code image running on each node in the mesh network and version of the code image. The apparatus further includes an update script generator for generating, if a code image running on a target node in the mesh network needs to be updated, a code update script with reference to the code images of the target node and its neighboring nodes stored in the code image DB, and performing update of the target node using the code update script.

15 Claims, 8 Drawing Sheets

(56) References Cited

U.S. PATENT DOCUMENTS

| | | | | |
|---|---|---|---|---|
| 8,464,249 | B1* | 6/2013 | Goldman et al. | 717/176 |
| 8,510,729 | B2* | 8/2013 | Weissman et al. | 717/170 |
| 8,516,475 | B2* | 8/2013 | Akiyoshi et al. | 717/174 |
| 8,612,516 | B2* | 12/2013 | Mallur et al. | 709/203 |
| 2010/0095293 | A1 | 4/2010 | O'Neill et al. | |

OTHER PUBLICATIONS

Cai et al, "Experiences Integrating and Scaling a Performance Test Bed Generator with an Open Source CASE Tool", IEEE, pp. 1-10, 2004.*

El-Kwae et al, "Efficient Content-Based Indexing of Large Image Databases", ACM Transactions on Information Systems, vol. 18, No. 2, pp. 171-210, 2000.*

Fu et al, "Node Splitting Algorithms in Tree-Structured High-Dimensional Indexes for Similarity Search", ACM, pp. 766-770, 2002.*

Hui, Jonathan W. et al., "The Dynamic Behavior of a Data Dissemination Protocol for Network Programming at Scale," Proceedings of the 2nd International Conference on Embedded Networked Sensor Systems, SenSys '04 (2004(.

Reijers, Niels et al., "Efficient Code Distribution in Wireless Sensor Networks," Proceedings of the 2nd ACM International Conference on Wireless Sensor Networks and Applications, WSNA '03 (2003).

\* cited by examiner

APPARATUS AND METHOD FOR COOPERATIVELY UPDATING FIRMWARE ON WIRELESS MESH NETWORK

CROSS-REFERENCE TO RELATED APPLICATION(S)

The present invention claims priority of Korean Patent Application No. 10-2010-0103929, filed on Oct. 25, 2010, which is incorporated herein by reference.

FIELD OF THE INVENTION

The present invention relates to a wireless mesh network, and more particularly, to an apparatus and method for cooperatively updating firmware running on nodes in a wireless mesh network, to thereby stably perform firmware update while reducing bandwidth through inter-node cooperation on the wireless mesh network.

BACKGROUND OF THE INVENTION

Wireless mesh network technology refers to a network technology that covers a wide area without any connection to a wired network by having access points in an existing wireless LAN equipped with network functions such as multi-hop routing and interconnecting these functions using a wireless communication technology.

In a wireless mesh network, nodes are installed at places not easily reachable by people, or a large number of nodes are installed. Hence, it is difficult to collect the nodes once they are installed, making it difficult to maintain and repair software in the nodes. To solve this problem, a variety of firmware over-the-air (FOTA) technologies for wirelessly updating firmware in nodes have been suggested.

Most of these technologies have their basis in reducing the size of code images for firmware update. By comparing a code image running on a node with a new code image to be transmitted, a differential script, such as the diff program of Linux, which describes the differences between the two code images, is generated. A target node generates a new code image by making the best use of a redundant part between the currently running code image and the code image transmitted to be run by using the thus-generated script.

The method described above has a significant effect of bandwidth reduction because a new code can be generated by transmitting a part of the script if only a part of the existing code image is modified. When changing to a new image totally different from the existing code image, however, the size of the new code image itself may be less than the size of the script.

Meanwhile, in the wireless mesh network, nodes autonomously configure the network, and data is transmitted in a multi-hop fashion. In this environment, to update multiple nodes in a particular area with similar content, it is necessary to transmit similar data multiple times in a multi-hop fashion, which causes bandwidth waste.

For example, FIG. 1 illustrates the concept of sequential network re-programming in a wireless mesh network according to the prior art. As shown in FIG. 1, if a target node needs to be updated, raw images of the same data size are continuously transmitted for update from a base station (BS) 100 to the target node requiring update via intermediate nodes. This results in an increase in the bandwidth usage of the network to update images, leading to unnecessary waste of the bandwidth of the network.

SUMMARY OF THE INVENTION

In view of the above, the present invention provides an apparatus and method for cooperatively updating firmware running on nodes in a wireless mesh network, to stably perform firmware update through inter-node cooperation by transmitting a differential script from a base station to a target node on the wireless mesh network.

In accordance with an aspect of the present invention, there is provided an apparatus for updating firmware running on nodes in a wireless mesh network.

The apparatus for updating firmware includes a code image database for storing a code image running on each node in the mesh network, and version of the code image.

The apparatus for updating firmware also includes an update script generator. The update script generator for generates, if a code image running on a target node in the mesh network needs to be updated, a code update script with reference to the code images of the target node and its neighboring nodes stored in the code image database, and performs update of the target node using the code update script.

In accordance with another aspect of the present invention, there is provided a method for updating firmware running on nodes in a wireless mesh network.

The method for updating firmware includes checking whether a code image currently running on a target node in the mesh network needs to be updated.

The method for updating firmware also includes generating a code update script with reference to the currently running code image of the target node and the respective code images running on its neighboring nodes when the code image of the target node needs to be updated.

The method for updating firmware also includes performing update of the code image of the target node to a new code image using the code update script.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, the operating principle of the present invention will be described in detail with reference to the accompanying drawings.

Figure 1:
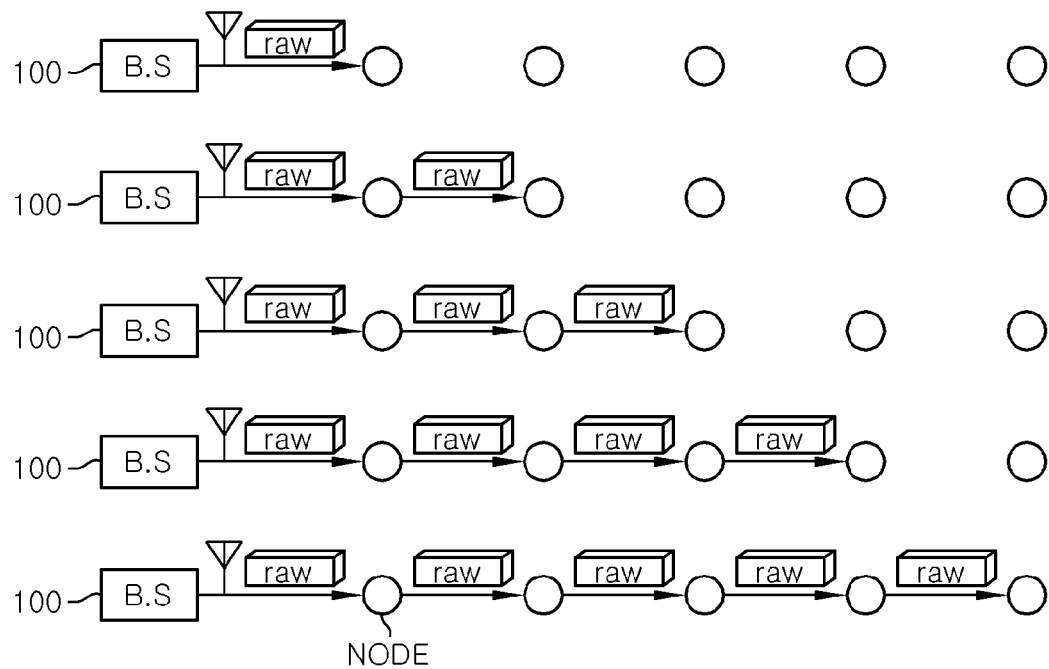
FIG. 1 is a view illustrating a conventional firmware update method in a wireless mesh network transmitting raw code images from a base station to a target node.
Figure 2:
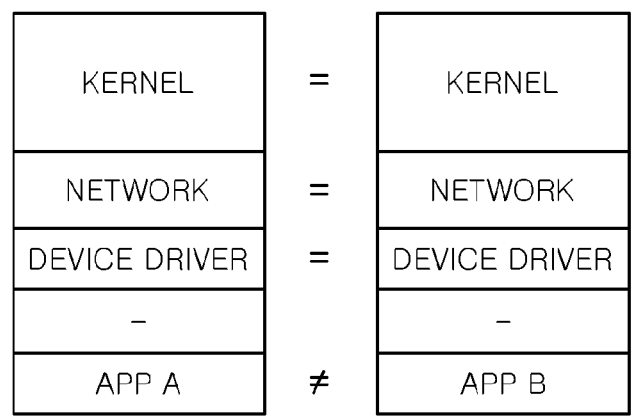
FIG. 2 shows the representation of code images running on nodes in a wireless mesh network.

FIG. 2 illustrates the configuration of code images running on nodes in a wireless mesh network. Each node in the wireless mesh network may differ in their application programs to be executed. However, the modules, such as kernel, network stack, application protocol, and the like, are commonly used by all nodes, and therefore the code image running on each node can have common binary of the corresponding modules. Such a factor may enable an efficient update in updating the commonly used modules excepting the application programs, through the utilization of neighboring nodes.

Figure 3:
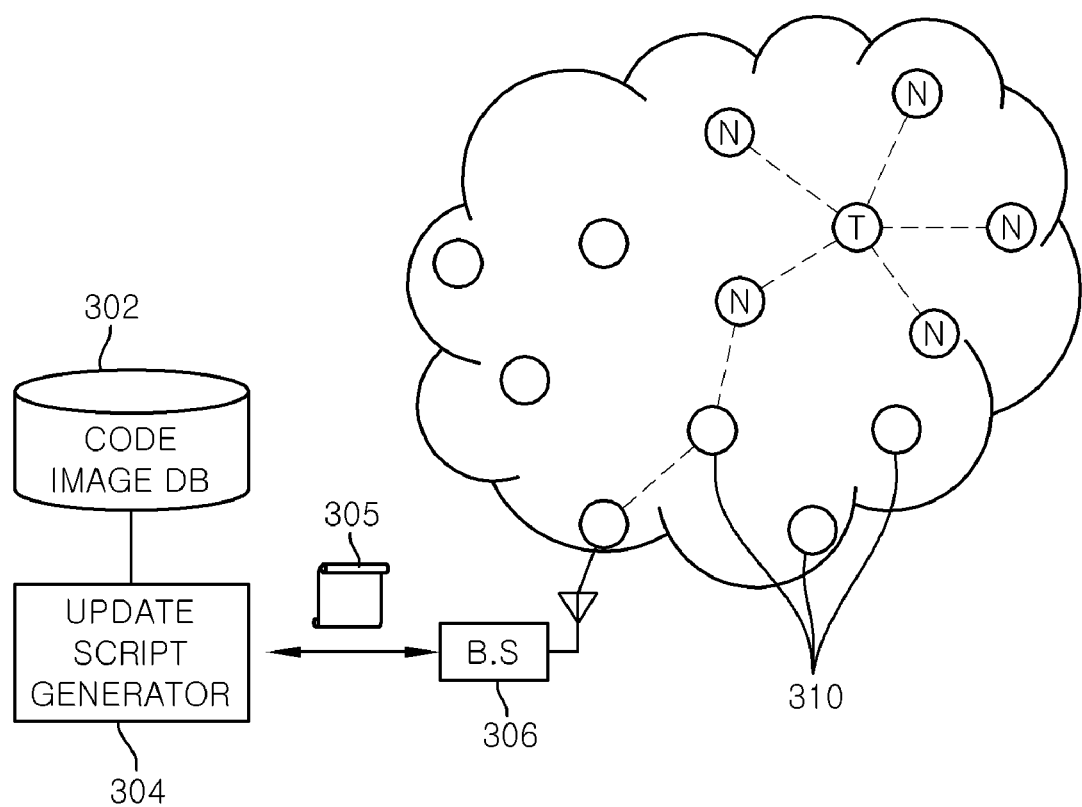
FIG. 3 illustrates an apparatus for cooperatively updating firmware running on nodes a wireless mesh network in accordance with an embodiment of the present invention.

FIG. 3 illustrates an apparatus for cooperatively updating firmware running on nodes in a wireless mesh network by employing the above concept in accordance with an embodiment of the present invention.

Referring to FIG. 3, a wireless firmware update apparatus of the present invention includes a plurality of nodes 310 constituting the wireless mesh network, a code image DB 302 for managing the code images currently running on the nodes 310, and an update script generator 304. The update script generator 304 generates a code update script 305 with reference to the code images currently running on a target node and its neighboring nodes, information of which are stored in the code image DB 302, when it is desired to change the running code of the target node.

The code image DB 302 stores the running code image of each node and the version number of that image. Accordingly, if the running code image of a certain node has been changed, data of the changed code image in the code image DB 302 also needs to be updated. The reason why running code images are stored and managed is to use them for a differential script to be generated when the code images are updated. Each node separately stores the version of the currently running code in order to manage the version of a code image to be run.

Figure 4:
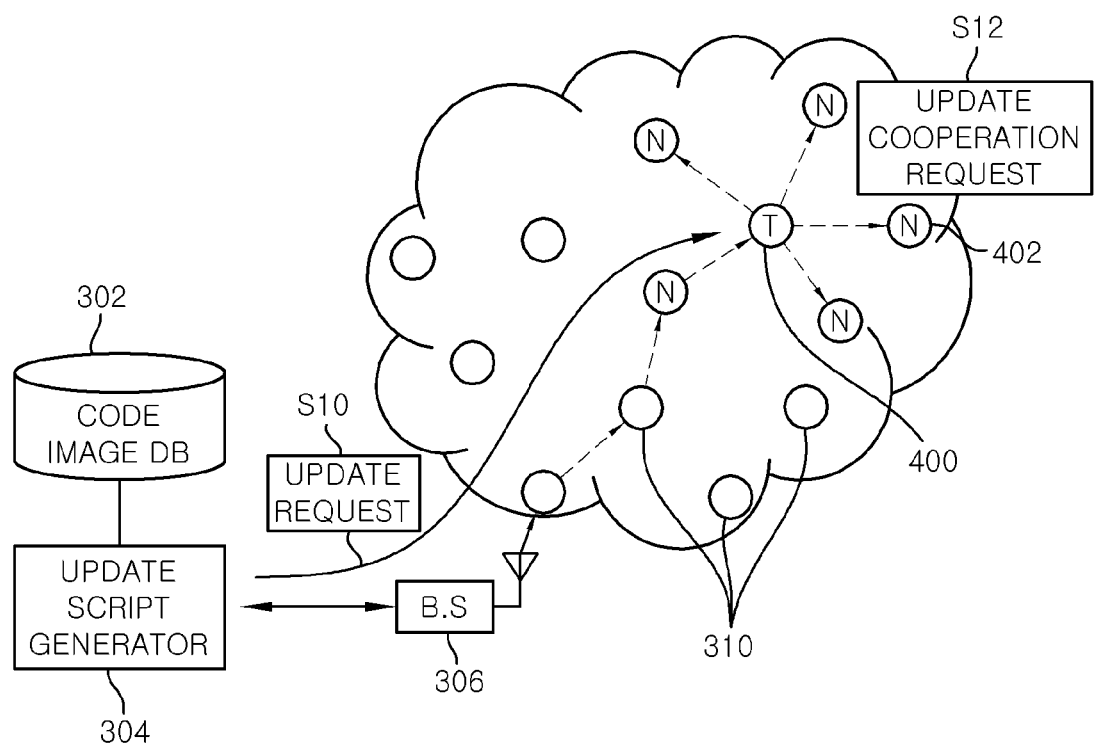
FIGS. 4 to 9 are views sequentially illustrating the process of cooperatively updating firmware running on a target node in accordance with the embodiment of the present invention.

FIG. 4 illustrates a procedure for performing update of a target node, especially, a procedure for requesting update, in the wireless firmware update apparatus in accordance with the present invention.

Referring to FIG. 4, if a new code image of the target node 400 to be updated has been generated by a base station 306, an update requesting message is generated with reference to the version of the target node 400 stored in the code image DB 302, wherein the update requesting message contains the referenced version of the currently running code of the target node 400 and the version of a new code one step higher than the currently running code. The update requesting message is then transmitted to the target node 400 via intermediate nodes 402 in step S10.

Upon receiving the update requesting message, in step S12, if the referenced version of the running code contained in the update requesting message is higher than that of currently running code in the target node 400, the target node 400 multicasts an update cooperation requesting message to the neighboring nodes 402. Thereafter, the target node 400 collects update cooperation response messages to the update cooperation requesting message from the neighboring nodes 402 for a predetermined time period.

Such an update cooperation requesting message is relayed by the neighboring nodes 400 to the neighboring nodes 402 within the multicast radius of one or more hops. In this case, it is expected that the network bandwidth can be reduced only when the multicast radius is shorter than the distance between the base station 306 and the target node 400.

Figure 5:
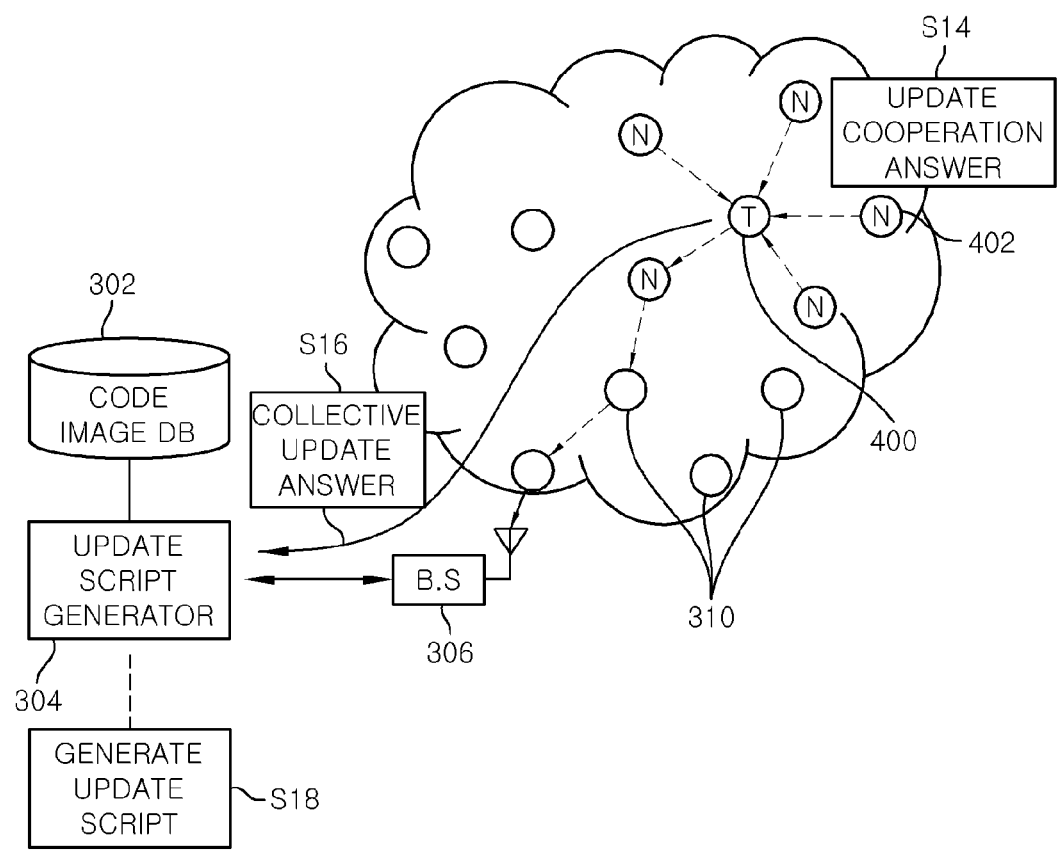

FIG. 5 illustrates a procedure for performing cooperative update of the target node 400, especially, a procedure for responding to the update requesting, in the firmware update apparatus in accordance with the embodiment of the present invention.

First, in step S14, upon receiving the update cooperation requesting message, the neighboring nodes 402 notify the target node 400 of an update cooperation answering message representing whether or not cooperation is possible. For example, if cooperation is impossible owing to shortage of power supply or the like, the neighboring nodes 402 may refuse to cooperate. In step S16, based on the update cooperation answering messages collected from the neighboring nodes 402, the target node 400 generates a collective update answering message indicating the participation or nonparticipation of the neighboring nodes 402 and transmits the collective update answering message to the base station 306.

Next, in step S18, the base station 306 provides the collective update answering message to the update script generator 304, and the update script generator 304 then generates a code update script using information about the participation or nonparticipation contained in the collective update answering message. In this step, the update scrip generator 304 generates the code update script by which the use of the least network bandwidth is allowed by using the code images of the target node 400 and its neighboring nodes 402 stored in the code image DB 302. More specifically, the update script generator 304 generates respective differential scripts between the current code image of the target node 400 and the respective code images of the neighboring nodes 402, and generates a code update script using as little network bandwidth as possible by taking into consideration the differential scripts and the distance to the referenced neighboring nodes 402.

Figure 6:
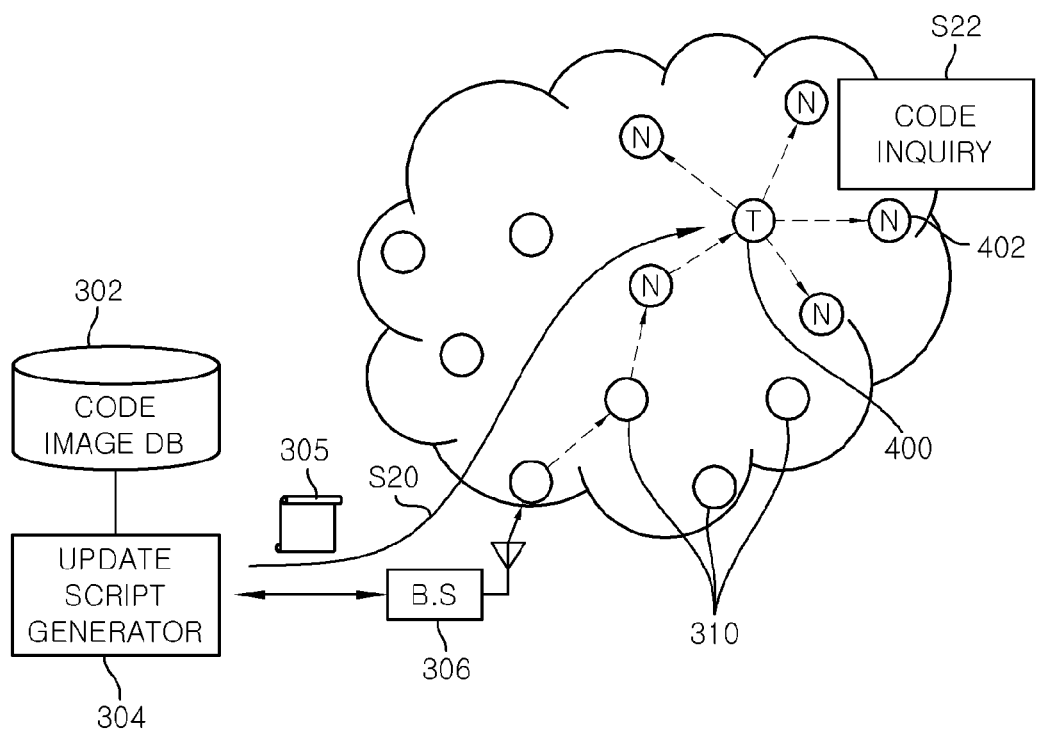

FIG. 6 illustrates a procedure for transmitting the code update script and inquiring the neighboring nodes of a code fragment in accordance with the embodiment of the present invention.

In step S20, the code update script 305 generated in the procedures of FIGS. 4 and 5 is transmitted to the target node 400 on an update scrip message. Upon receiving the update scrip message, the target node 400 then generates a new code image by executing the code update script 305 line by line. In this case, if there is any code fragment to be inquired from the neighboring nodes 402, a code inquiring message is transmitted to the neighboring nodes 402 in step S22. In response to the code inquiring message from the target node 400, the neighboring nodes 402 put a corresponding code fragment to the inquiry into a code inquiry answering message and provide it to the target node 400 in step S24.

Figure 7:
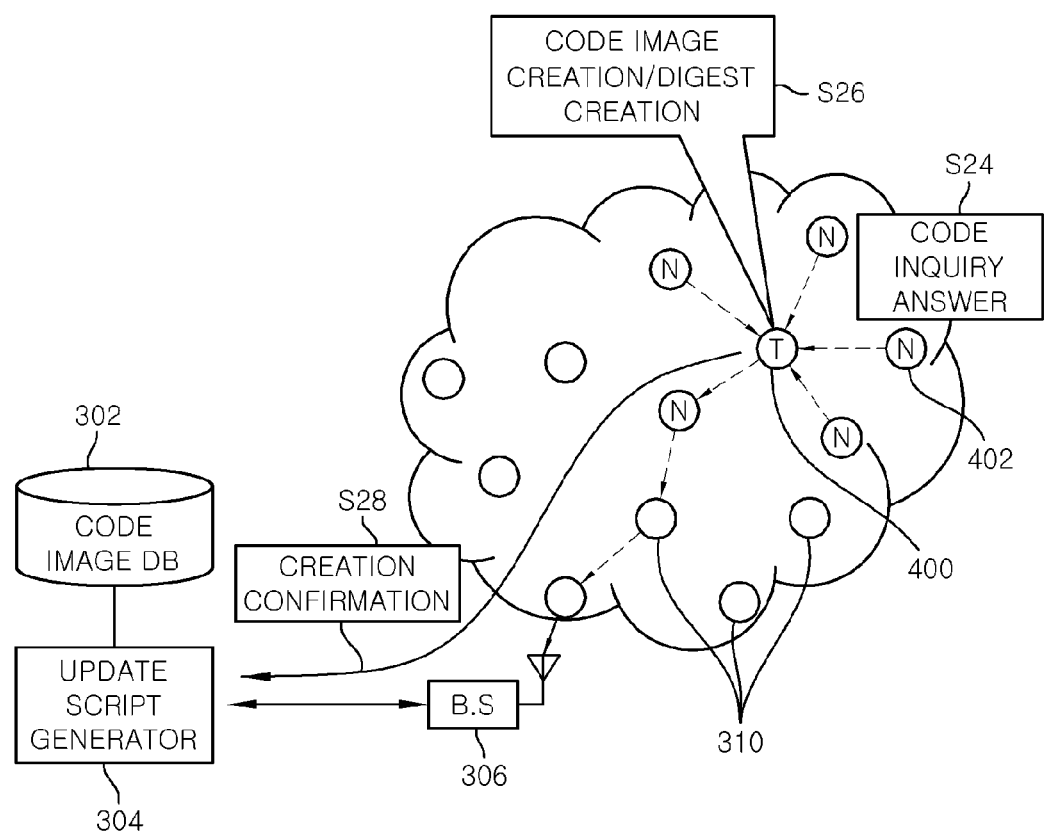

FIG. 7 illustrates a procedure for creating a new code image after the code image update in accordance with the embodiment of the present invention.

In step S26, the target node 400 completes the new code image using the code fragment provided from the neighboring nodes 402, and creates a digest by encrypting the completed code image to a hash function. And then, in step S28, the target node 400 transmits a creation confirmation message containing the digest to the base station 306.

In response to the creation confirmation message, the base station 306 verifies the integrity of the created code image by comparing the digest transmitted from the target node 400 with the digest of the raw code image created by the base station 306.

Figure 8:
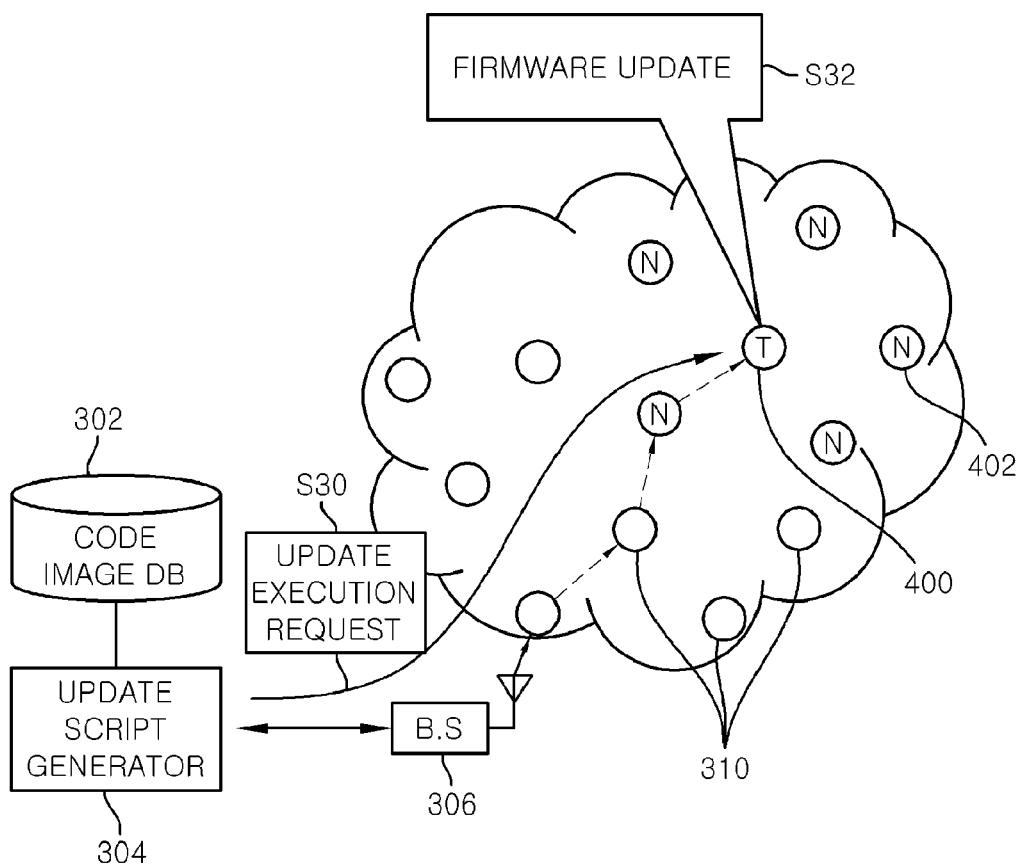
Figure 9:
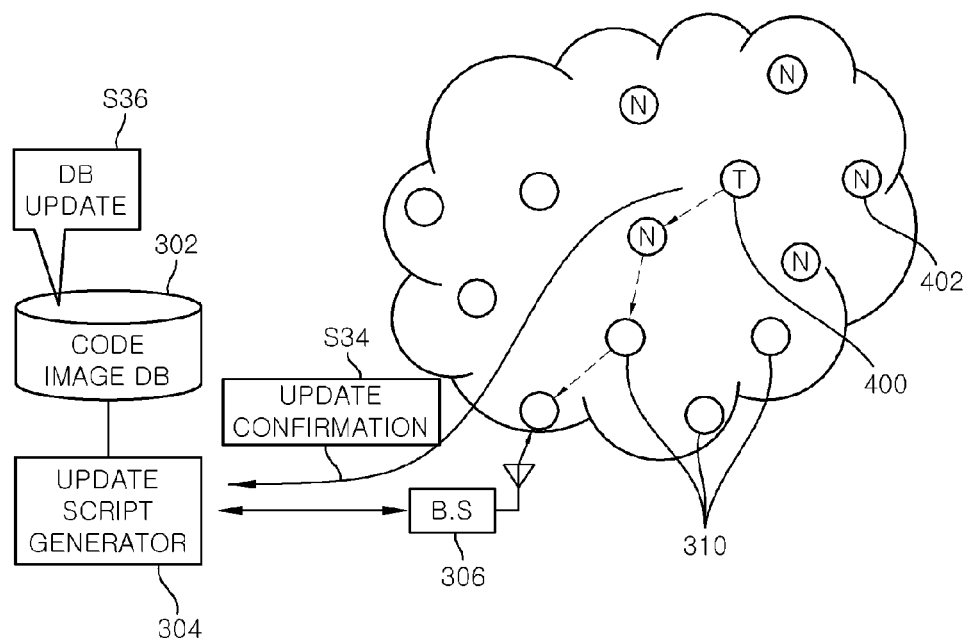

FIG. 8 illustrates a procedure for performing firmware update after verifying the integrity of the code image in accordance with the embodiment of the present invention, and FIG. 9 illustrates a procedure for reporting an update completion and updating the content of the code image DB in accordance with the embodiment of the present invention.

After the verification of the integrity of the code image, as shown in FIG. 8, the update script generator 304 transmits an update execution requesting message to the target node 400 in step S30, and the target node 400 executes firmware update accordingly in step S32. Subsequently, as shown in FIG. 9, the target node 400 transmits an update confirmation message to the update script generator 304 via the base station 306 after completion of the update in step S34, and the update script generator 304 updates the code image DB 302 with the new running code image of the target node 400 in step S36.

Figure 10:
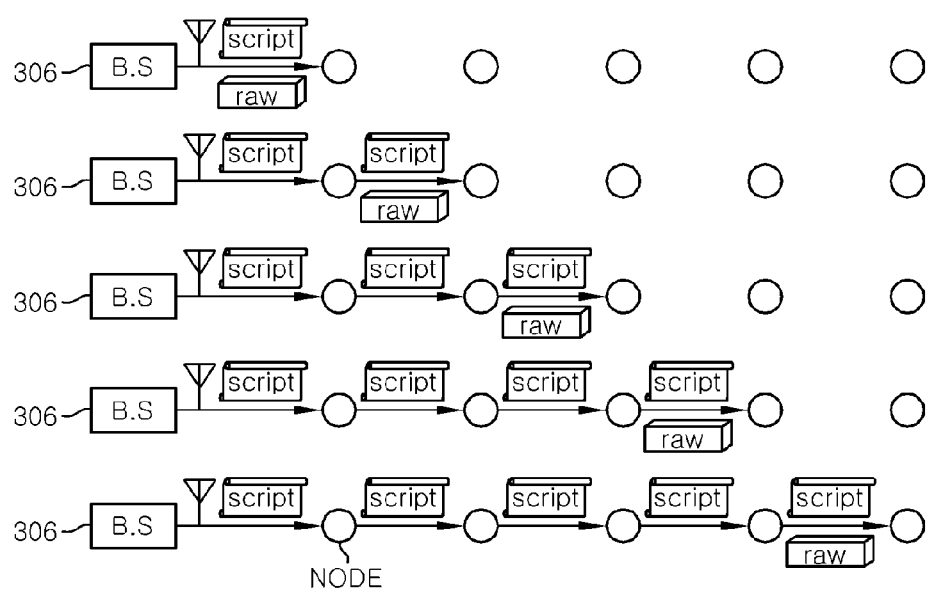
FIG. 10 illustrates the concept of sequential network reprogramming using cooperative firmware update in a wireless mesh network in accordance with the embodiment of the present invention.

FIG. 10 illustrates the concept of sequential network reprogramming using cooperative firmware update in a wireless mesh network in accordance with the embodiment of the present invention.

In the conventional differential script transmission method, network bandwidth waste can be reduced by transmitting a script, instead of a raw code image, from the base station to the target node. In this case, how small a differential script can be made is a key factor of the performance, as previously stated.

According to the present invention, as shown in FIG. 10, a differential script is generated with reference to the code images of the nodes around the target node, as well as the past code images of the target node, and therefore it is possible to make a much smaller script than an existing differential script.

In addition, in case of network reprogramming where common functions of multiple nodes on the network are sequentially updated, after completion of the update of a certain node, the subsequent node will refer to the image of the completed node. In this way, the transmission of the raw image over the entire network can be minimized, and a smaller script can be instead transmitted, thereby achieving efficient firmware update. Especially, even when the existing differential script gives little benefit because the new image has little in common with the previous image, large benefits are expected from the reduction of network bandwidth usage.

As described above, the present invention can perform firmware update through inter-node cooperation by allowing each node in the wireless mesh network to transmit a differential script, instead of the raw image, from the base station to the target node, using commonly used binary information, such as kernel, network stack, application protocol, and the like. Therefore, bandwidth can be reduced, and firmware update and maintenance management can be done more stably.

While the invention has been shown and described with respect to the particular embodiments, it will be understood by those skilled in the art that various changes and modification may be made.

What is claimed is:

1. An apparatus for updating firmware running on nodes in a wireless mesh network, the apparatus comprising a processor configured to embody a plurality of functional units including:
   a code image database (DB) for storing a code image running on each node in the mesh network, and a version of the code image; and
   an update script generator for generating, if a code image running on a target node in the mesh network needs to be updated, a code update script with reference to the code images of the target node and its neighboring nodes stored in the code image DB, and performing an update of the target node using the code update script,
   wherein the update script generator is configured to:
   generate respective differential scripts between the currently running code image of the target node and the respectively currently running code images of the neighboring nodes, and
   generate the code update script with reference to the differential scripts and the distance to the neighboring nodes to which the code images are referenced, and transmit the code update script to the target node for performing the update.

2. The apparatus of claim 1, wherein the code image of the target node in the code image DB is updated to a new code image generated by using the update script generator when performing update of the target node.

3. The apparatus of claim 1, wherein the update script generator is configured to transmit an update requesting message to the target node when the target node needs to be updated, receive an update answering message from the target node to the update requesting message, and generate the code update script for updating the target node based on the information contained in the update answering message.

4. The apparatus of claim 3, wherein the target node is configured to multicast an update cooperation requesting message to the neighboring nodes when the version of the new code image is higher than that of the code image currently running on the target node.

5. The apparatus of claim 4, wherein the update cooperation requesting message is transmitted from the target node to the neighboring nodes within the multicast radius of a predetermined number of hops.

6. The apparatus of claim 4, wherein the target node is configured to receive an update cooperation answering message from the neighboring nodes to the update cooperation requesting message for a predetermined time period, and generate the update.

7. The apparatus of claim 6, wherein the target node is configured to transmit, to the base station, the update answering message collectively including information indicating the participation or nonparticipation of the neighboring nodes based on the update cooperation answering messages received from the neighboring nodes.

8. The apparatus of claim 1, wherein the target node is configured to create the new code image to be updated by executing the code update script, transmitted from the update script generator, line by line.

9. The apparatus of claim 1, wherein the target node is configured to:
   transmit a code inquiring message to the neighboring node when the new code image is created and there is any code fragment to be inquired from the neighboring nodes, and
   receive a code inquiry answering message to the code inquiring message to create the new code image through the use of the code fragment.

10. A method for updating firmware running on nodes in a wireless mesh network, the method comprising:
    checking whether a code image currently running on a target node in the mesh network needs to be updated;
    when the code image of the target node needs to be updated, generating a code update script with reference to the currently running code image of the target node and the respective code images running on its neighboring nodes; and
    performing update of the code image of the target node to a new code image using the code update script,
    wherein the generating the code update script includes:
    generating respective differential scripts between the currently running code image of the target node and the code images of the neighboring nodes, and
    generating the code update script with reference to the differential scripts and the distance to the neighboring nodes to which the code images are inquired.

11. The method of claim 10, wherein said generating a code update script comprises:
transmitting an update requesting message to the target node;
receiving an update answering message from the target node to the update requesting message; and generating the code update script for updating the target node based on information contained in the update answering message.

12. The method of claim 10, wherein the new code image is created by executing the code update script line by line at the target node,
the method further comprising verifying the integrity of the new code image by comparing a digest of the new code image with a digest of a raw code image; and
when the integrity of the new code image is verified, allowing firmware update on the target node.

13. The method of claim 11, further comprising:
checking, at the target node, in response to the update requesting message, whether the version of the new code image is higher than that of the currently running code image of the target node; and
if the version of the new code image is higher than that of the currently running code image of the target node, multicasting an update cooperation requesting message to the neighboring nodes.

14. The method of claim 13, further comprising:
collecting, at the target node, update cooperation answering messages indicating the participation or nonparticipation from the neighboring nodes to the update cooperation requesting message for a predetermined time period; and
generating the update answering message containing information about the participation or nonparticipation of the neighboring nodes.

15. The method of claim 14, wherein the update cooperation request is transmitted from the target node to the neighboring nodes within the multicast radius of a predetermined number of hops.

* * * * *